United States Patent [19]
Neefe

[11] 3,786,812
[45] *Jan. 22, 1974

[54] CONTACT LENS FOR OLAR DRUG DELIVERY

[76] Inventor: Charles W. Neefe, Box 429, Big Spring, Tex. 79720

[ * ] Notice: The portion of the term of this patent subsequent to Sept. 25, 1990, has been disclaimed.

[22] Filed: Mar. 10, 1972

[21] Appl. No.: 233,408

Related U.S. Application Data

[63] Continuation-in-part of Ser. No. 45,333, June 11, 1970, which is a continuation-in-part of Ser. No. 562,022, May 16, 1966, abandoned.

[52] U.S. Cl. ................................. 128/260, 351/162
[51] Int. Cl. ............................................ A61m 7/00
[58] Field of Search.. 128/260; 351/162, 160; 264/1

[56] References Cited
UNITED STATES PATENTS

| 2,241,415 | 5/1941 | Moulton | 351/162 |
| 3,710,796 | 1/1973 | Neefe | 128/260 |
| 3,361,858 | 1/1968 | Wicherle | 264/1 |
| 3,710,795 | 1/1973 | Higuchi | 128/260 |
| 3,228,741 | 1/1966 | Becker | 128/260 |

Primary Examiner—Aldrich F. Medbery

[57] ABSTRACT

A method of making a contact lens for delivering medications directly to the ocular tissue. The central segment being transparent and capable of correcting refractive errors. The peripheral segment containing the desired medication and the rate at which the medication is released to the eye is controlled.

4 Claims, 4 Drawing Figures

PATENTED JAN 22 1974 3,786,812

INVENTOR.
Charles W. Nagel

CONTACT LENS FOR OLAR DRUG DELIVERY

This is a continuation-in-part of patent application Ser. No. 45,333 filed June 11, 1970 entitled "A Dimensionally Stable Permeable Contact Lens" which is a continuation-in-part of an earlier application Ser. No. 562,022 filed May 16, 1966 and now abandoned.

The delivery of drugs to the cornea at the desired levels over an extended period of time has been a difficult task. This is due in part to the fact that the cornea has no blood supply therefore the circulatory system cannot be relied upon to transport the medications to the cornea. This renders continuous intravenous drip, rectal suppositories, injections and oral administration of drugs of little practical value for delivering medications to the corneal tissue. The use of these delivery methods will in most cases result in a toxic level of the drug in the body fluids beyond the acceptance of the active centers before the effective dosage is reached in the corneal tissue.

Drops or liquid forms of medication instilled in the eye are quickly diluted by the tears and are rapidly carried away by accelerated lacrimation.

Solid soluble drugs cannot be placed in the eye due to the intense discomfort generated during the blink cycle.

The present invention relies on a contact lens having a central optical segment which may be fabricated to correct any refractive errors the patient may have and thereby provide improved visual acuity while the medication is being administered. The medication is contained in the peripheral segment and released at a predetermined rate directly to the epithelium of the cornea. The drug as it is absorbed into the ocular tissue will be available at the constant predetermined level for the eye will rapidly equilibrate.

Figure 1:
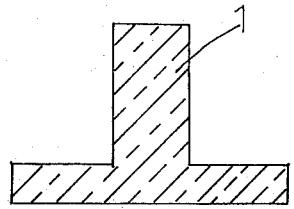
FIG. 1 shows the transparent cylinder.

This method of drug delivery is excellent for the administration of pilocarpine oil or pilocarpine hydrochloride since a very slow delivery rate is desired over an extended period of time for the control of glaucoma.

Antimicrobial drugs will require a faster release rate but for a shorter period of time. Examples of useful antimicrobial agents are tetracyline, sulfonamides, ampicillin trihydrate, oxytetracyline, penicillin, chloramphenicol, nystatin and many others. It must be understood that each drug may require a different release rate and duration to obtain the desired therapeutic effect.

DETAILED DESCRIPTION OF INVENTION

The release rate of the drug to the corneal tissue is controllable by many methods. Examples:
1. The solubility of the drug in water,
2. The water content of the lens material,
3. The permeability of the lens material,
4. Microencopsulation of the drug within the lens,
5. Pre-extraction of the lens,
6. Barriers to retard drug migration from the lens,
7. Dispursed within a parsimonious particle to form a matrix.

1. The solubility of the drug may be altered by using derivatives of the desired drug, as an example pilocarpine base which is an oil and its derivative pilocarpine hydrochloride which is soluble. The release rate of the pilocarpine oil is much slower than the release rate of the pilocarpine hydrochloride.

2. The water content of the hydrophilic lens material may be controlled by modifying the chemical composition of the polymer. Examples:

A hydrophilic lens material composed of ethyleneglycol monomethacrylate cross-linked with 0.2 percent ethyleneglycol dimethacrylate when polymerized and hydrated will contain up to 70% water in the fully hydrated state.

A hydrophilic lens material composed of diacetone acrylamide 30 percent, methyl methacrylate 20 percent, ethyleneglycol monomethacrylate 49 percent, ethylene dimethacrylate 1 percent when polymerized and hydrated will contain less than 20 percent water when fully hydrated. Pilocarpine will diffuse slower from the polymer containing less water and meter the flow of drug to the cornea.

3. The lens material may be altered to control the flow of the drug within the lens material. This may be done by copolymerization or cross-linking. Cross-linking the lens material after hydration has been found to be very effective since the water volume within the lens is stabilized and drug flow from the lens is correspondingly stabilized. One method of cross-linking after hydration consists of adding allyl methacrylate to the material formulation and after hydration exposing the hydrated lens to high energy radiation as from radioactive cobalt isotopes.

4. The release rate may be controlled by microencopsulation of the drug within lens material. Microencopsulation can be effected by coating small spherical particles of the drug with a film of silicone. The drug particles may be suspended by compressed air in a fluidized bed and the silicone carried to the drug particles by the compressed air.

5. Pre-extraction may be advantageous to remove excess drug from the lens material. When a therapeutic level is desired for a given period of time preextraction of a part of the drug from the lens is desirable. Pre-extraction can be accomplished by placing the lens in normal saline and agitating for a given period of time. The use of pure water will accelerate the drug removal and in some instances is desirable since an assay of the drug present in the water will determine the quantity remaining in the lens.

6. Barriers to retard drug migration from the lens may be placed at the lens surface or below the surface. The barriers consist of a film of high density material such as described in (2) and the polymer may be composed of diacetone acrylamide 30 percent, methyl methacrylate 20 percent, ethyleneglycol monomethacrylate 49 percent, ethyleneglycol dimethacrylate 1 percent.

7. The most effective and useful method of controlling release rate in contact lenses has been the use of a parsimonious particle containing the drug within the particle and the drug containing particles are dispursed within a matrix of drug transporting material. The parsimonious polymer has a low water content and may be as follows: diacetone acrylamide 10 to 50 percent, methyl methacrylate 10 to 40 percent, ethyleneglycol monomethacrylate 20 to 40 percent, cross-linking agents such as allyl methacrylate and ethylene dimethacrylate may be used from 0.1 to 5 percent to slow the release rate further. An increase in the amount of diacetone acrylamide also slows the release rate from the particle. Increasing the amount of ethyleneglycol monomethacrylate will increase the rate of drug release from the particle. An example of a drug transporting material follows ethyleneglycol monomethacrylate cross-linked with 0.2 percent ethyleneglycol dimethacrylate when polymerized and hydrated water soluble drugs may migrate freely through the material.

The lens is made as follows. A cylinder (1 FIG. 1) having a diameter of from 2 millimeters to 10 millimeters is cut from a block of transparent water absorbing polymer in the xerogel state a supporting flange is provided at the lower end.

The cylinder is placed in a suitable mold (3 FIG. 2) which may be metal, silicone rubber, or polyethylene. The transparent water absorbing polymer has a preselected expansion when hydrated.

Figure 2:
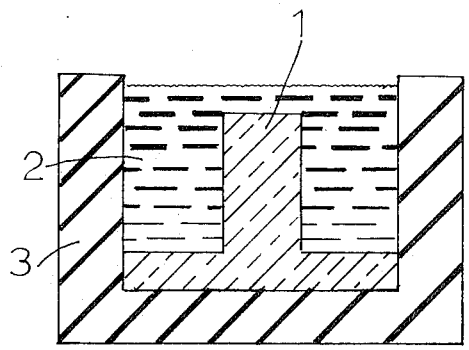
FIG. 2 shows in section the transparent cylinder in a mold with the liquid monomer in place.
Figure 3:
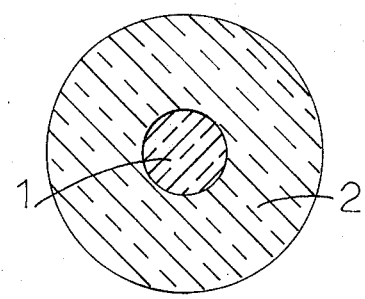
FIG. 3 shows the finished lens from the front.
Figure 4:
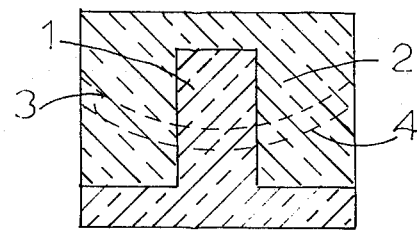
FIG. 4 shows in section the blank from which the lens is cut.

The mold shown in section 3 FIG. 2 is filled with a selected liquid monomer containing the drug, the selected delivery method and a suitable catalyst (2 FIG. 3) heat is applied and the liquid monomer is polymerized to form a monolithic mass shown in FIG. 4. The presence of the drug in the outer portion (2 FIG. 4) will render this portion of the material translucent or opaque. The central portion (1 FIG. 4) will be transparent. A lens (FIG. 3) may be cut from the block (FIG. 4) having a transparent aperture in the center and containing the drug in the peripheral zone. The expansion when hydrated of the two materials (1 and 2 FIG. 3) must be equal or the lens shape will distort when hydrated. The release rate of the drug may be controlled by any combination of the seven previously listed methods. The seventh will be repeated as an example.

Parsimonious particles are prepared as follows. 10 grams pilocarpine oil is mixed by ultra-sonic energy with diacetone acrylamide 30 grams, methyl methacrylate 20 grams, ethyleneglycol monomethacrylate 48 grams, ethylene dimethacrylate 2 grams, tertiary butyl peroctoate 0.3 grams is placed in an oven at 70°C under a nitrogen atmosphere for 5 hours to effect polymerization. The resultant friable mass is reduced to a powder.

The parsimonious particles are dispursed in the following liquid, ethyleneglycol monomethacrylate 100 grams, ethyleneglycol dimethacrylate 0.2 grams, tertiary butyl peroctoate 0.3 grams. The presence of the barrier particles affects the expansion when hydrated. A sample of the above mixture is therefore polymerized in a nitrogen atmosphere by heating to 70°C for 5 hours the sample hydrated and its expansion noted.

The hydrophilic cylinder (1 FIG. 1) is now formed from a selected material having the same expansion when hydrated. An example of the material: ethyleneglycol monomethacrylate 100 grams, ethyleneglycol dimethacrylate 1 gram, tertiary butyl peroctoate 0.3 grams heat to 70°C for 5 hours in a nitrogen atmosphere. The expansion of the material when hydrated can be adjusted by changing the amount of the cross-linking agent ethyleneglycol dimethacrylate. Increasing the ethyleneglycol dimethacrylate will decrease the expansion when hydrated.

The cylinder (1 FIG. 1) having the same expansion when hydrated as the drug containing material (2 FIG. 3) is placed in the mold (3 FIG. 2) and the drug containing monomer mixture (2 FIG. 2) is added. The mold is placed in an oven at 70°C under a nitrogen atmosphere for 5 hours and the solid block containing the transparent cylinder (1 FIG. 4) is formed. A contact lens (FIG. 2) is cut from the block and hydrated before being placed on the cornea. The lacrimal fluid will slowly remove the drug from the high density parsimonious particles into the lower density material where it will migrate to the cornea surface and be absorbed by the ocular tissue.

Lenses containing parsimonious particles made by the above method may be recharged or reactivated by immersing the lens in a concentrated solution of pilocarpine hydrochloride or other drug for 8 hours. The use of ultrasonic energy will increase the absorption of the drug. The desired therapeutic effect can then be obtained from the recharged lens. The recharged parsimonious particles retain and slowly release the drug due to the attraction of the parsimonious particles for the drug molecules when in solution.

I claim:

1. A contact lens for the delivery of therapeutic drugs to the eye comprising:
    a contact lens having continuous smooth curved surfaces of concavo-convex form in section, said lens having a transparent central optical area and a peripheral area surrounding said central area having a therapeutic drug embedded within said peripheral area and providing said therapeutic drug to the eye at a selected rate.

2. A contact lens as in claim 1 wherein said contact lens comprises a hydrophilic lens fabricated in the xerogel state and hydrated before being placed on the eye, said transparent central area and the drug-containing peripheral area having an equal expansion ratio to provide a continuous smooth curved surface in the xerogel and hydrated state.

3. A contact lens as in claim 1 wherein the selected release rate of the drug is controlled by providing parsimonious particles of low water content polymer containing said drug within said peripheral area, said parsimonious particles being embedded within a matrix of high water content polymer.

4. A contact lens as in claim 2 and further comprising:
    said hydrophilic lens being formed from a polymer having allyl methacrylate as an ingredient, said hydrated lens being exposed to radiation from radioactive cobalt isotopes to effect cross-linking of the hydrated polymer.

* * * * *